Figure 1:
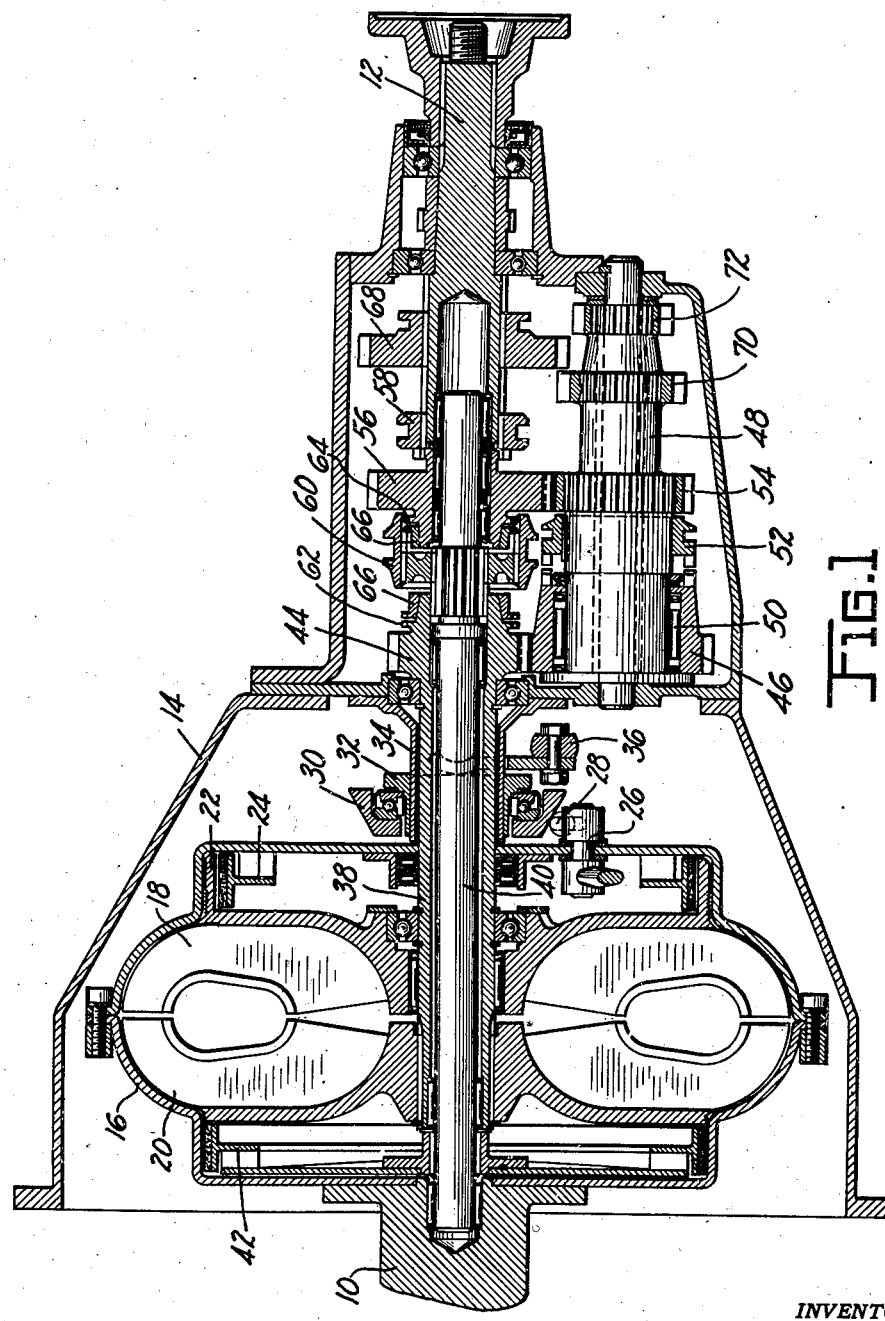

Aug. 15, 1944.  A. Y. DODGE  2,355,709
TRANSMISSION
Filed May 13, 1940  2 Sheets-Sheet 1

INVENTOR.
ADIEL Y. DODGE
BY McConkey and Booth
ATTORNEYS.

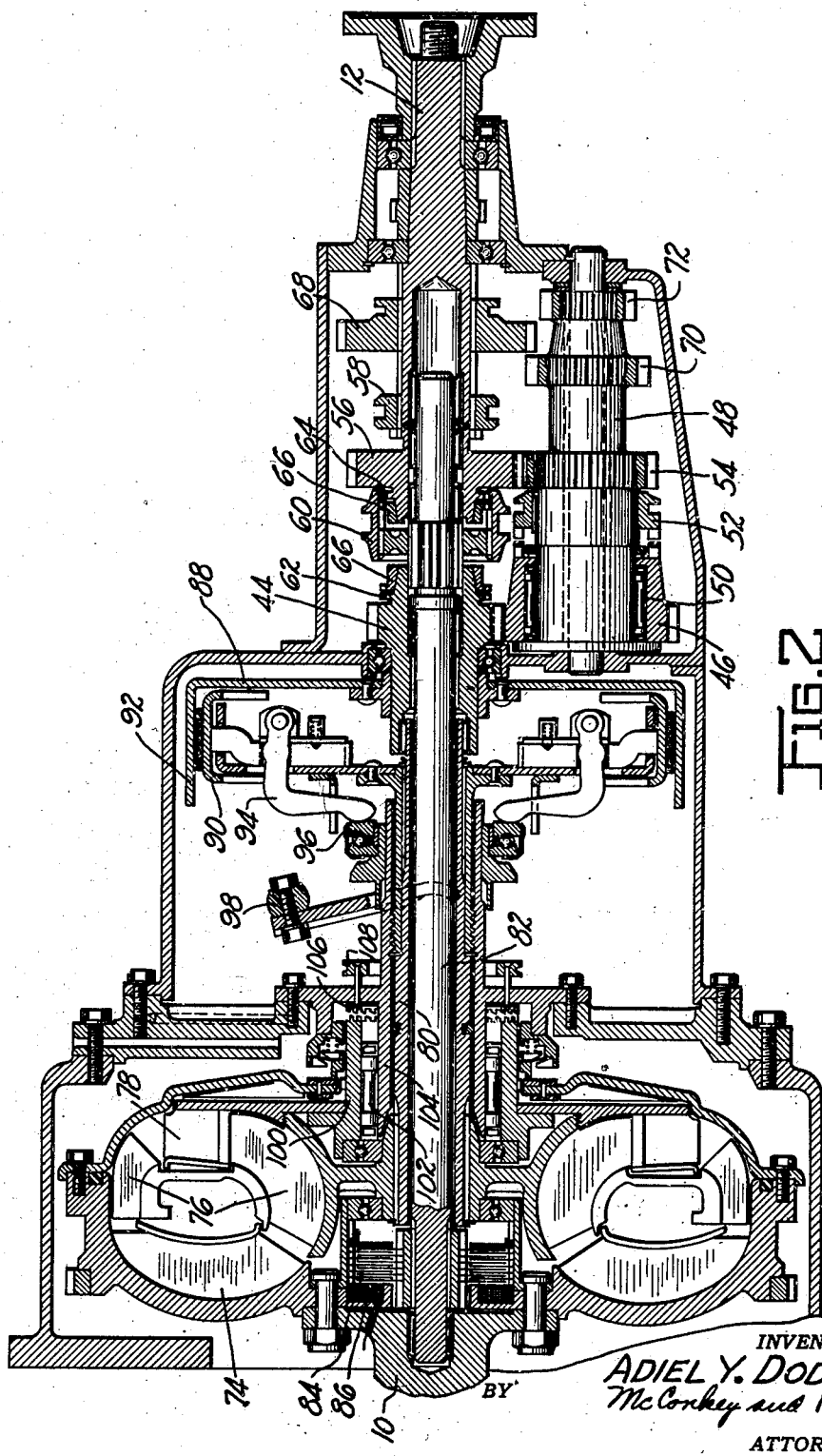

Patented Aug. 15, 1944

2,355,709

UNITED STATES PATENT OFFICE 2,355,709

TRANSMISSION

Adiel Y. Dodge, Rockford, Ill.

Application May 13, 1940, Serial No. 334,705

15 Claims. (Cl. 74—189.5)

This invention relates to transmissions and more particularly to transmissions adapted for use in vehicles for transmitting torque at a plurality of speed and torque ratios.

One of the objects of the invention is to provide a transmission which will transmit torque through an infinite number of speed ratios in one or more torque ranges. According to one feature of the invention the transmission may reach a condition of one-to-one drive through purely mechanical connections.

Another object of the invention is to provide a transmission which will start in a high torque low speed range including an infinitely variable drive unit and may later go into a direct mechanical drive. In one desirable construction the change to direct drive is made automatically in response to speed and in another construction it may be made manually at any time.

Still another object of the invention is to provide a transmission which is disconnected below a predetermined speed of the driving member and which automatically starts to drive above that speed.

Yet another object of the invention is to provide a transmission which will transmit torque from the driven to the driving shaft to resist overrunning of the driven shaft. According to one important feature the transmission includes a hydraulic torque converter whose stator may be locked to provide a reaction member for hydraulically resisting overrunning of the driven shaft.

Under ordinary driving conditions, two forward torque and speed ratios suffice to produce satisfactory performance. This is particularly so where a form of fluid drive is employed. However, under extreme conditions or adverse conditions an additional lower speed ratio is desirable, for instance, when pulling a heavy trailer or where the going is difficult or when climbing hills. With this in view, I have provided a transmission which can be automatically started in an intermediate fluid driven gear ratio and will automatically change itself to a higher gear ratio mechanically driven, and have provided a still lower gear ratio which may be employed through a manual control, as well as a reverse.

I am aware that various transmissions have been proposed to accomplish similar objectives. However, the purpose of this invention is to provide means to accomplish these objectives with relatively high efficiency and without the use of additional gears over and above those employed in the present-day conventional change speed gear box, and further than this to provide a gear arrangement the control members of which are caused to function by shift means very similar, if not identical, to the shift means now employed in the conventional gear box.

The above and other objects, advantages and novel features of the invention will be apparent from the following description of the embodiment shown in the accompanying drawings, in which:

Figures 1 and 2 are axial sections of two alternative transmission constructions embodying the invention.

The transmission of Figure 1 is illustrated as connecting a driving shaft 10 to a driven shaft 12 and is housed in a stationary casing 14 which may replace the usual transmission casing in an automotive vehicle. The driving shaft 10 is connected to and drives a split housing 16 which surrounds and encloses an infinitely variable speed coupling formed by a vaned impeller 18 and a vaned rotor 20. The impeller 18 is freely mounted in the housing 16 and is provided with a flange 22 adapted to be engaged by a series of clutch shoes 24 carried by the housing 16 to connect the housing and the impeller. The clutch 24 may be constructed according to my Patent No. 2,087,968 or my copending application Serial No. 334,706 filed May 13, 1940. The clutch shoes 24 are adapted to be held out of engagement with the flange 22 by linkage operated by a shaft 26 in the housing 16. The shaft 26 is formed outside of the housing with a plurality of projecting arms 28 whose end portions may be engaged by a cam ring 30. The cam ring 30 is supported on bearings on a collar 32 which is slidable on a sleeve 34 secured to the casing 14, and may be actuated by a fork unit 36, operated in any desired manner by the driver. When the cam ring 30 is urged to the left it will rock the shafts 26 to hold the clutch 24 out of engagement, but when the yoke 36 is released the cam ring will move to the right and permit the clutch 24 to move into engagement under the action of centrifugal force.

A pair of coaxial driving shafts 38 and 40 are provided extending axially through the hydraulic unit, and the hydraulic rotor 20 is splined to the outer shaft 38. The inner shaft 40 carries a clutch mechanism 42 for connecting the housing 16 and the shaft 40 in response to the speed of the shaft.

A driving gear 44 is carried by the sleeve 38 and meshes with a gear 46 on a lay-shaft 48. A combined one-way clutch and bearing 50 of the type shown in my Patent No. 2,113,722 connects the gear 46 to the lay-shaft 48 so that the gear will drive the lay-shaft in one direction only. A direct type clutch 52 is preferably provided splined to the lay-shaft to connect the gear 46 thereto positively.

A second gear 54 fixedly secured to the lay-shaft meshes with a gear 56, which is rotatable on an extension of the shaft 40. The gear 56 may be connected to the driven shaft by a shiftable clutch member 58 splined to the driven shaft and engageable with clutch teeth on the gear 56.

The shaft 40 has splined thereon between the gears 44 and 56 a shiftable clutch member 60, which is adapted to engage clutch teeth 62 on the gear 44 or similar clutch teeth 64 on the gear 56. As shown, both clutch teeth 62 and 64 have associated therewith friction collars 66 to facilitate meshing of the clutch member 60 therewith.

A large gear 68 is slidably splined on the driven shaft and may be moved into mesh with a third gear 70 on the lay-shaft or with a reverse idler driven by a reverse gear 72 on the lay-shaft. The several shiftable elements 60, 58, 68 and 52 may be shifted by any desired type of mechanism, either power or manual, through conventional type shift levers in the gear box.

Members 60 and 68 may be shifted in the old familiar fashion using the old type shift fork and shift rail familiar to the art. In this transmission, there remain two control members 52 and 58 in addition to the members 60 and 68 still to be shifted. Member 52 may be shifted into engagement with teeth on 46, that is shifted to the left, by an auxiliary fork member functioning with the fork member which shifted control member 60 (not shown). The auxiliary fork employed to shift 52 preferably should be provided with a yielding connection so that the clutch teeth of 52 may contact the corresponding clutch teeth of member 46 when member 60 is in the extreme left position, and engage later when the teeth register. The clutch teeth are provided with ejection angles so that they will engage only upon synchronization.

Control member 58 may be urged by a spring loaded fork to the left to engage member 56 normally. This member 58 may be forced out of engagement when the primary shift member (not shown) is crossed over to that rail on which the shift fork slides which shifts member 68. In this way, I have utilized the old control existing in a conventional gear box and added thereto two auxiliary shift forks and auxiliary controls to shift the two additional control members which I have introduced in my gear box.

In starting the vehicle, this transmission provides a fluid drive initially in all of the various speeds including reverse which automatically changes to a mechanical drive if and provided some predetermined speed has been reached and exceeded. This is deemed to be preferable to transmissions of the type in which a mechanical start is followed by a hydraulic drive.

To obtain a low speed high torque drive the clutch 60 is shifted to a neutral position, the clutch 58 is disengaged from the gear 56, and the gear 68 is shifted into mesh with the gear 70. As the driving shaft 10 is turned it will reach a speed at which clutch 24 will engage and the shaft 38 will be driven through the hydraulic coupling. This will drive gear 44 and through it gear 46 and the lay-shaft 48 to turn the driven shaft at reduced speed through gears 68 and 70. Preferably at this time the clutch 52 is engaged with the gear 46 to provide a positive two-direction drive. For reverse the other parts may remain in the same position, but the gear 68 may be shifted to engage the reverse idler so that the direction of rotation of the driven shaft will be the reverse of that of the driving shaft.

For intermediate speed providing a positive drive the gear 68 may be moved to its neutral position as shown and the clutch 60 may be shifted into engagement with the clutch teeth 62. The clutch 52 is preferably engaged with the gear 46 as before and the clutch 58 is shifted into engagement with the gear 56. After clutch 24 engages, the gear 44 will drive through gears 46, 54 and 56 to turn the driven shaft at reduced speed. After the speed gets high enough to cause engagement of the clutch 42, a positive mechanical connection will be established between the driving shaft 10 and the gear 44 to provide a positive reduced speed drive.

For normal high speed forward operation the clutch 52 is disengaged from the gear 46, the clutch 60 is shifted into engagement with the gear 56, and the clutch 58 remains in engagement with gear 56. After the clutch 24 engages, the driven shaft will be driven at reduced speed through the hydraulic unit and gears 44, 46, 54 and 56. As the speed of the driven shaft increases the clutch 42 will move into engagement to connect the driving shaft 10 directly with the driven shaft through clutch 60, gear 56, and clutch 58. At this time the lay-shaft 48 overruns the gear 46 through the one-way clutch 50.

If it is desired at any time to operate the engine at relatively high speed without transmitting torque to the driven shaft the clutch 24 may be held out of engagement by operating the yoke 36 through a foot pedal or the like, so that the housing 16 may turn freely without driving any of the other transmission parts.

In the construction of Figure 2 the gear unit is identical with that of Figure 1 and the several parts thereof have been designated by the same reference numerals as those in Figure 1. In this construction the driving shaft 10 drives the impeller 74 of a hydraulic torque converter which includes a rotor having spaced sets of vanes 76 between which is arranged a set of stator vanes 78. The rotor is connected to a sleeve 80 coaxial with an intermediate shaft 82 corresponding to the shaft 40 of Figure 1. A disk type clutch 84, actuated by a solenoid 86, which may be controlled at will from any desired point, serves to connect the driving shaft 10 to the shaft 82. The driven sleeve 80 is connected to the gear 44 through a clutch indicated generally at 88, and which may be similar to the clutches 24 and 42 of Figure 1. As shown, the clutch 88 includes a plurality of shoes 90 engageable with a drum 92, which is secured to the gear 44. The shoes 90 may be actuated in response to centrifugal force and are connected to levers 94 engaging a thrust bearing 96. The bearing 96 may be urged to the right by a yoke 98 to hold the clutch out of engagement when desired.

The stator vanes 78 are carried by a hub 100 mounted on a one-way clutch and bearing 102 on a stationary sleeve 104. During normal operation the clutch 102 prevents reverse rotation of the stator while permitting it to overrun forwardly as the driving ratio between the impeller and rotor approaches one to one. In order to provide an increased hydraulic braking effect as for example, in descending hills the hub 100 is formed at its end with a series of clutch teeth engageable with similar teeth on a ring 106 slidably carried by the transmission casing. The ring 106 is controlled through a collar 108, so that the teeth thereon may be shifted into engagement with the teeth on the hub when desired to lock the stator. The stator may thus form a reaction member for liquid in the torque converter to resist overrunning of the driven shaft.

The transmission of Figure 2 may be operated through substantially the same gear connections as described in Figure 1 to provide varying conditions of drive. However, since the hydraulic unit of Figure 2 is, in itself, capable of multiplying torque each of the gear ranges will embody an infinitely variable torque as well as speed range. When direct mechanical drive is desired, the clutch 84 may be engaged.

In descending steep grades, or under like conditions, the ring 106 may be shifted into engagement with the stator hub to lock it so that the braking effect of the engine will be increased or augmented by a hydraulic braking effect in the torque converter.

While two embodiments of the invention have been shown and described in detail it will be understood that they are illustrative only and are not intended as a definition of the scope of the invention, reference being had for this purpose to the appended claims.

What is claimed is:

1. In a transmission in combination, a change speed gear box and a variable speed driving unit, two telescoped coaxial driving shafts, a driven shaft in line therewith, a lay-shaft parallel thereto, a driven gear connected to the lay-shaft by a one-way clutch, means to lock out the one-way clutch to connect said driven gear to the lay shaft for transmission of torque in both directions therebetween, means to drive said driven gear through one path from the variable speed unit, means to drive the colinear driven shaft from second means through a second path of power flow, while the one-way clutch allows the driven gear on the lay-shaft to idle, automatic means responsive to the speed of one of the shafts to pick up the second path above a predetermined speed, and means to cut out the second path of power flow when desired.

2. A transmission for connecting a driving shaft to a driven shaft comprising an infinitely variable speed driving unit connected to the driving shaft to be driven thereby, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, an intermediate shaft adapted to connect the driving and driven shafts directly, and control means for controlling direct connection of the driving and driven shafts through the intermediate shaft.

3. A transmission for connecting a driving shaft to a driven shaft comprising an infinitely variable speed driving unit, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, an intermediate shaft adapted to connect the driving and driven shafts directly, and a shiftable clutch member on the intermediate shaft to connect it with either the driving gear or the driven shaft.

4. A transmission for connecting a driving shaft to a driven shaft comprising an infinitely variable speed hydraulic torque transmitting unit, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, means to lock out the one-way clutch to connect said one of the gears to the lay shaft for transmission of torque in both directions, an intermediate shaft adapted to connect the driving and driven shafts directly, means to connect the intermediate shaft to the driven shaft, and a controllable clutch to connect the intermediate shaft to the driving shaft.

5. A transmission for connecting a driving shaft to a driven shaft comprising an infinitely variable speed driving unit, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, an intermediate shaft adapted to connect the driving and driven shafts directly, clutch means for connecting or disconnecting the intermediate shaft, a third gear and a reverse gear on the lay-shaft, and a shiftable gear on the driven shaft engageable with the third gear or the reverse gear to provide low speed or reverse drive.

6. A transmission for connecting a driving shaft to a driven shaft comprising an infinitely variable speed driving unit, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, an intermediate shaft adapted to connect the driving and driven shafts directly, clutch means for connecting or disconnecting the intermediate shaft, a third gear and a reverse gear on the lay-shaft, and a shiftable gear on the driven shaft engageable with the third gear or the reverse gear to provide low speed or reverse drive, and clutch means for locking out said one-way clutch to provide a positive connection between the lay-shaft and said one of the gears thereon.

7. A transmission for connecting a driving shaft to a driven shaft comprising an infinitely variable speed driving unit, a driving gear driven by said unit, a lay-shaft parallel to the driven shaft, a gear on the lay-shaft meshing with the driving gear, a gear connected to the driven shaft, a second gear on the lay-shaft meshing with the last named gear, a one-way clutch connecting the lay-shaft to one of the gears thereon, an intermediate shaft adapted to connect the driving and driven shafts directly, a shiftable clutch member on the intermediate shaft to connect it with either the driving gear or the driven shaft, and clutch means for locking out said one-way clutch to provide a positive connection between the lay-shaft and said one of the gears thereon.

8. A transmission for connecting a driving shaft to a driven shaft comprising an infinitely variable speed driving unit driven by the driving shaft, coaxial shafts, means for connecting the coaxial shafts respectively to the driving shaft and said unit, a driving gear on the coaxial shaft which is connected to the unit, a lay-shaft, a driven gear on the lay shaft meshing with the driving gear, a gear means connecting the driven gear to the driven shaft, a second gear on the lay shaft meshing with the last named gear, a one-way clutch connecting the lay-shaft to one of the gears thereon, and a shiftable clutch for connecting the other of said coaxial shafts to the driven gear.

9. A transmission for connecting a driving shaft to a driven shaft comprising an infinitely variable speed driving unit driven by the driving shaft, coaxial shafts, means for connecting the coaxial shaft respectively to the driving shaft and said unit, a driving gear on the coaxial shaft which is connected to the unit, a lay-shaft, a gear on the lay-shaft meshing with the driving gear, a driven gear, means connecting the driven gear to the driven shaft, a second gear on the lay-shaft meshing with the last named gear, a one-way clutch connecting the lay-shaft to one of the gears thereon, a shiftable clutch for connecting the other of said coaxial shafts to either the driving gear or the driven gear, and a clutch controlling connection of said other of the coaxial shafts to the driving shaft.

10. A transmission for connecting a driving shaft to a driven shaft comprising an infinitely variable speed driving unit driven by the driving shaft, coaxial shafts, means for connecting the coaxial shafts respectively to the driving shaft and said unit, a driving gear on the coaxial shaft which is connected to the unit, a lay-shaft, a gear on the lay-shaft meshing with the driving gear, a driven gear, means connecting the driven gear to the driven shaft, a second gear on the lay-shaft meshing with the last named gear, a one-way clutch connecting the lay-shaft to one of the gears thereon, a shiftable clutch for connecting the other of said coaxial shafts to either the driving gear or the driven gear, a clutch controlling connection of said other of the coaxial shafts to the driving shaft, and a shiftable clutch for locking out said one-way clutch to provide a positive connection between the lay-shaft and said one of the gears thereon.

11. A transmission for connecting a driving shaft to a driven shaft comprising an infinitely variable speed driving unit driven by the driving shaft, coaxial shafts one of which is connected to said driving unit, a driving gear driven by said one shaft, clutch means connecting the other coaxial shaft to the driving shaft, a lay-shaft, a gear on the lay-shaft meshing with the driving gear, a driven gear, clutch means connecting the driven gear to the driven shaft, a second gear on the lay-shaft meshing with the driven gear, a one-way clutch connecting the lay-shaft to one of the gears thereon, a shiftable clutch to lock out the one-way clutch, a third gear and a reverse gear on the lay-shaft, a shiftable gear on the driven shaft engageable with either the third gear or the reverse gear, and a shiftable clutch on said other coaxial shaft to connect it to either the driving gear or the driven gear.

12. A transmission for connecting a driving shaft to a driven shaft comprising an infinitely variable speed driving unit having a driving member and a driven member, a pair of coaxial shafts, one of which is connected to the driven member, a gear set connected to the driven shaft and having two driving elements connected respectively to the coaxial shafts, a clutch operated in response to the speed of the driving shaft to connect the driving shaft to the driving member, and a clutch operated in response to the speed of a member driven by the driving member to connect the driving shaft to the other of said coaxial shafts.

13. A transmission for connecting a driving shaft to a driven shaft comprising an infinitely variable speed driving unit having a driving member and a driven member, a pair of coaxial shafts, one of which is connected to the driven member, a gear set connected to the driven shaft and having two driving elements connected respectively to the coaxial shafts, a clutch operated in response to the speed of the driving shaft to connect the driving shaft to the driving member, manual means to hold said clutch out of engagement at will and a clutch operated in response to the speed of a member driven by the driving member to connect the driving shaft to the other of said coaxial shafts.

14. A transmission for connecting a driving shaft to a driven shaft comprising a vaned impeller driven by the driving shaft, a vaned rotor and a vaned stator, a one-way brake for holding the stator against reverse rotation, a pair of coaxial shafts one of which is connected to the rotor, a clutch for connecting the other coaxial shaft to the driving shaft, a gear train connected to the driven shaft and including two driving elements connected to the coaxial shafts respectively, and control means in the gear train and including said clutch for establishing driving connections through the gear train from either of said driving elements.

15. A transmission for connecting a driving shaft to a driven shaft comprising a vaned impeller driven by the driving shaft, a vaned rotor and a vaned stator, a one-way brake for holding the stator against reverse rotation, shiftable means to lock the stator to provide a reaction member to resist overrunning of the driven shaft, a pair of coaxial shafts one of which is connected to the rotor, a clutch for connecting the other coaxial shaft to the driving shaft, a gear train connected to the driven shaft and including two driving elements connected to the coaxial shafts respectively, and control means in the gear train and including said clutch for establishing driving connections through the gear train from either of said driving elements.

ADIEL Y. DODGE.